US005902076A

United States Patent [19]

Miller et al.

[11] Patent Number: 5,902,076

[45] Date of Patent: May 11, 1999

[54] QUILL FEED FOR A PORTABLE DRILL ADAPTED TO BE MOUNTED TO A WORK SURFACE

[75] Inventors: Jeffrey R. Miller, Gaines; Joseph A. Schultz, Flint, both of Mich.

[73] Assignee: Hougen Manufacturing, Inc., Swartz Creek, Mich.

[21] Appl. No.: 09/165,613

[22] Filed: Oct. 2, 1998

Related U.S. Application Data

[60] Provisional application No. 60/061,079, Oct. 3, 1997.

[51] Int. Cl.[6] .................................................... B23B 45/14

[52] U.S. Cl. .................................. 408/6; 408/11; 408/56; 408/76; 408/135; 408/141

[58] Field of Search ............................... 408/5, 6, 10, 11, 408/13, 56, 57, 68, 76, 135, 136, 141, 204

[56] References Cited

U.S. PATENT DOCUMENTS 983,083 1/1911 Pealing .
1,330,130 2/1920 Mason .
1,861,099 5/1932 Smith ...................................... 408/141
2,863,338 12/1958 Stewart .
3,216,287 11/1965 Pleger et al. .
3,383,958 5/1968 Mottu .
3,487,748 1/1970 Grage ...................................... 408/135
3,969,036 7/1976 Hougen .
4,604,006 8/1986 Shoji et al. ............................... 408/76
4,626,152 12/1986 Palm .
4,639,170 1/1987 Palm .
4,664,565 5/1987 Palm .
4,687,385 8/1987 Palm .
4,688,975 8/1987 Palm .
5,035,547 7/1991 Shoji ........................................ 408/76
5,282,704 2/1994 Screen .
5,383,751 1/1995 Wheetley et al. .

FOREIGN PATENT DOCUMENTS

130576A2 7/1987 Russian Federation .
831410 5/1981 U.S.S.R. ................................. 408/76

*Primary Examiner*—Daniel W. Howell
*Attorney, Agent, or Firm*—Howard & Howard

[57] ABSTRACT

A magnetic based drill assembly comprising a support platform mounted to the magnetic base for attachment to a work piece includes a feed mechanism operatively connected to the platform for rectilinear movement between a fully retracted position and a fully extended position. The feed mechanism includes a splined collar slidably mounted to the splined arbor for movement relative to the splined arbor and for rotatably supporting a drive tool. The motor is mounted in a stationary position offset and substantially parallel to the feed mechanism to reduce overall height and weight of the drill assembly. As the splined arbor is located within a cylindrical feed arbor a liquid coolant can be directly injected on the drill tool and workpiece during operation of the drill assembly. Further, an electrical feed rate monitor provides a signal to the user to indicate the optimal feed rate of the drill tool.

20 Claims, 5 Drawing Sheets

QUILL FEED FOR A PORTABLE DRILL ADAPTED TO BE MOUNTED TO A WORK SURFACE

The present invention claims priority to Provisional application Ser. No. 60/061,079 filed Oct. 3, 1997.

BACKGROUND OF THE INVENTION

The present invention relates to a portable drill which can be mounted to a work surface, and more particularly to a quill feed for a magnetic based drill or other drill having a base that can be attached to a work surface.

Magnetic based drill assemblies (magdrills) are used extensively in the metal fabricating field for forming holes in various workpieces where it is either impractical or inconvenient to move the workpiece to a conventional drill press. Accordingly, as the magdrill is moved to the workpiece, it is advantageous to provide the most portable and compact drill assembly possible. Additionally, as the drill assembly is operated in a construction environment it is preferable that the magdrill have a minimum number of exposed moving parts. The minimization of exposed parts improves the durability and the maintenance requirements of the magdrill.

Typically, magnetic based drill assemblies have an arbor coupled to a motor which is attached to a slide assembly. The slide assembly is mounted for vertical movement in relation to a magnetic base. A handle is typically used to rotate a gear which rectilinearly moves the slide assembly between a retracted position and an extended position to form a hole in a workpiece. Thus, to drill a hole, the entire motor, arbor, slide, and drill tool must be slidably actuated in a vertical plane relative to the magnetic base.

Drilling a precision hole in a substantial workpiece such as a steel I-beam, pipe or plate, requires a relatively powerful electrical motor to maintain an acceptable rate of operation. Due to the strength and precision required to moveably support the entire motor, arbor, slide, and drill tool, the drill assembly is relatively bulky and difficult to maneuver along a workpiece. Additionally, the quantity, weight and height of the moving parts provide an unbalanced drill assembly having a center of gravity which changes as the moving parts are vertically manipulated during drilling operations. The multiple moving parts, bulkiness, and unbalanced nature of conventional magdrill assemblies thus increase the amount of maintenance required to keep the drill assembly operational.

Further, it is preferable to introduce a liquid coolant to the drill tool and workpiece during operation of the drill assembly to reduce friction and heat. The liquid coolant is commonly provided from a storage tank to the drill tool by gravity or pressure. To introduce coolant to a drill tool through typical arbors commonly requires a series of intricately formed passageways or the installation of an adaptor adjacent the drill tool. However, in addition to the complexity of either method, the coolant is not fed directly into the drill tool which thereby reduces coolant and drill tool effectiveness.

Thus, there is a need for a magnetic based drill which is compact, has a minimum number of exposed moving parts and is of a relatively light weight.

SUMMARY OF THE INVENTION

The present invention provides a self attaching drill assembly comprising a support platform mounted to the self attaching base for attachment to a work piece. A support platform is mounted to the base for supporting a motor and support housing. A gear train is disposed in the housing for transferring the rotation of the motor to a splined arbor, whereby the splined arbor is slidably disposed within a cylindrical arbor having a mating splined bore. The cylindrical arbor is rotatably contained within a cylindrical housing having a rack of teeth. A feed mechanism operatively interconnects the platform and splined arbor for rotationally supporting the splined arbor and for rectilinearly moving the cylindrical housing and splined cylinder between a retracted and an extended position. A drill tool such as, for example, an annular cutter extends from the distal end of the splined cylinder for drilling the work piece.

Having mounted the motor in a stationary position off the slide, the present invention reduces the strength and precision requirements of the slide. In addition, by placing the motor in a stationary position on the support housing opposite the arbor, the overall package size of the present invention is relatively compact compared to typical magnetic based drill assemblies as the motor does not move vertically with the drill tool during operation.

Moreover, as the splined arbor is located within the cylindrical housing a liquid coolant can be directly injected into the drill tool during operation of the drill assembly. Preferably, a through bore is located in the splined arbor to direct coolant from a storage tank directly into the drill tool. Further, as the cylindrical arbor, splined arbor and cylindrical housing are solid the coolant can be directed under pressure thus allowing drilling operation to take place out of the horizontal plane while maintaining drill tool effectiveness.

Accordingly, the present invention provides a magnetic based drill assembly which is compact, has few exposed moving parts, is of a relatively light weight, has a relatively stationary center of gravity, and integrates pressurized coolant allowing overhead drilling operations.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
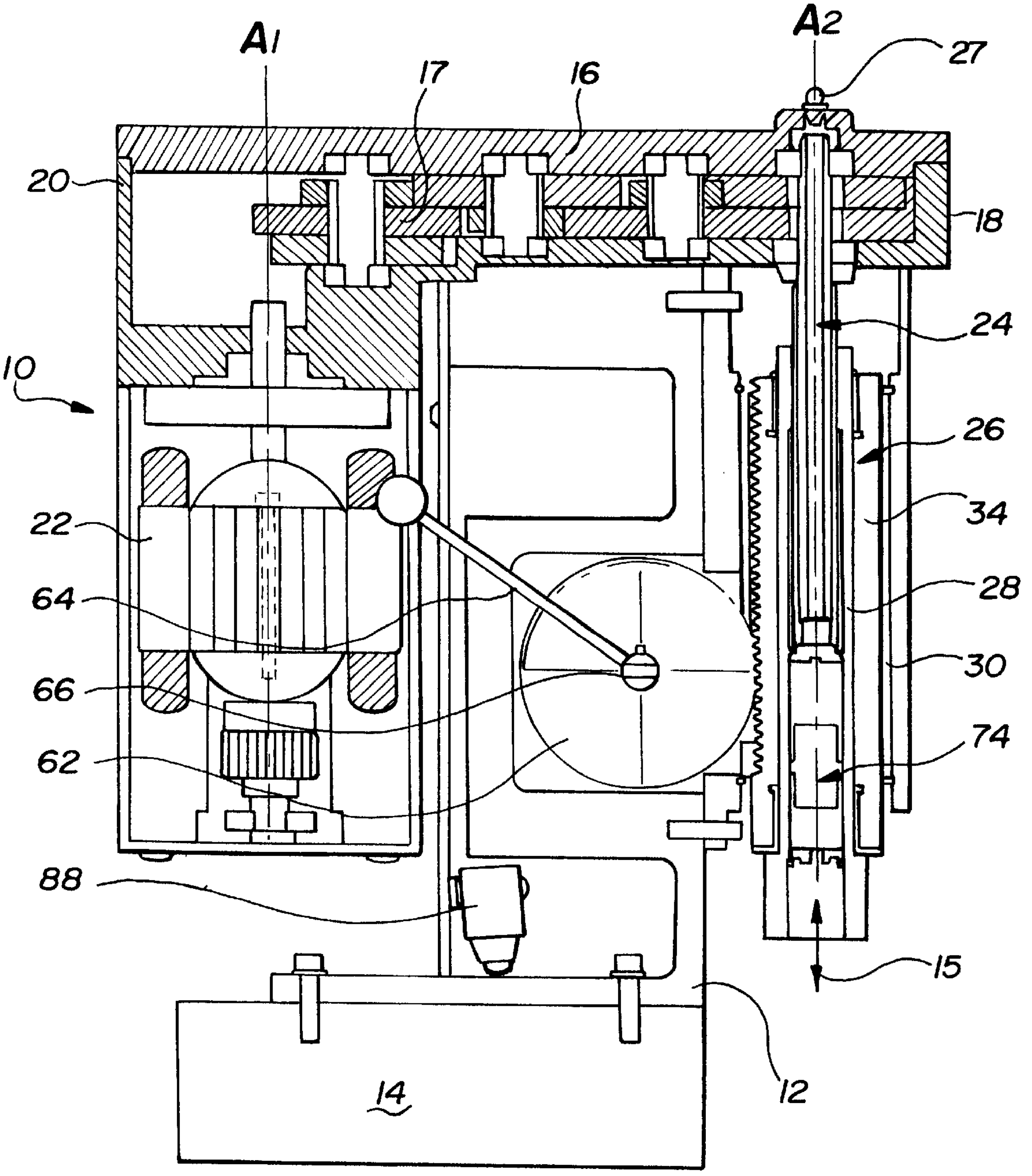
FIG. 1 is a sectional view of the present invention.

FIG. 1 illustrates a self attaching drill assembly 10 according to the present invention. For purposes of clarity, the present invention will be described with respect to a magnetic based drill with it being understood that pneumatic bases, couplings, etc. could be used.

As shown in FIG. 1, the magdrill assembly 10 includes a support platform 12 mounted to a magnetic base 14. A support housing 16, presenting a front end 18 and a rear end 20 opposite the front end 18, is mounted to a support platform 12. A motor 22, presenting a drive axis $A_1$, is mounted to the support housing 16 adjacent to the rear end 20 of the support housing 16. A 180° gear train 17, of a type known in the art, is disposed in the support housing 16 and is operatively connected to the motor 22. A splined arbor 24, presenting a driven axis $A_2$, is rotatably supported by the gear train 17 for rotation about the driven axis $A_2$. A feed mechanism, generally indicated at 26, includes a cylindrical housing 34 rotatably supporting a cylindrical arbor 28 which is slidably connected to a splined arbor 24.

Figure 2:
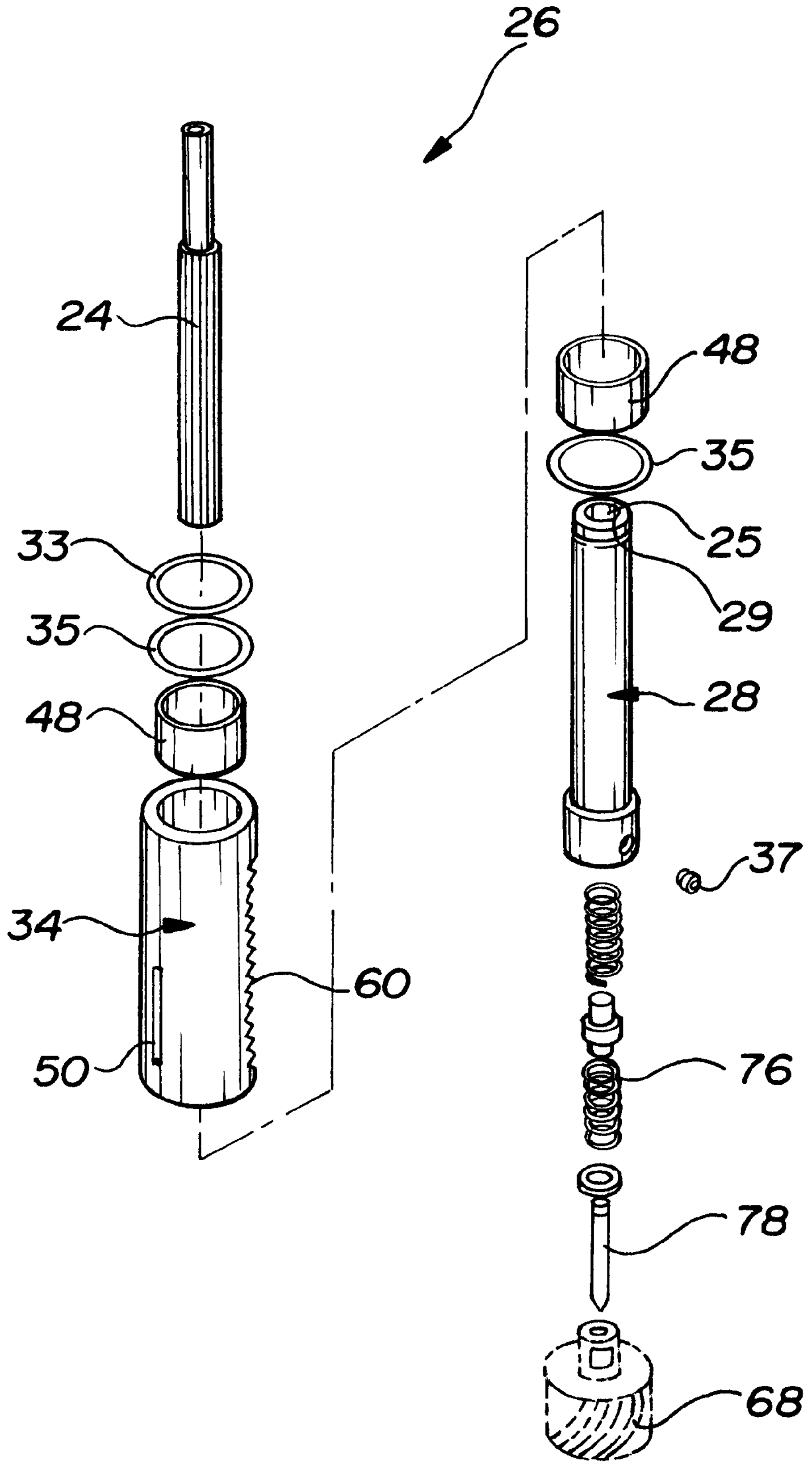
FIG. 2 is an exploded view of the quill assembly of the present invention.
Figure 3:
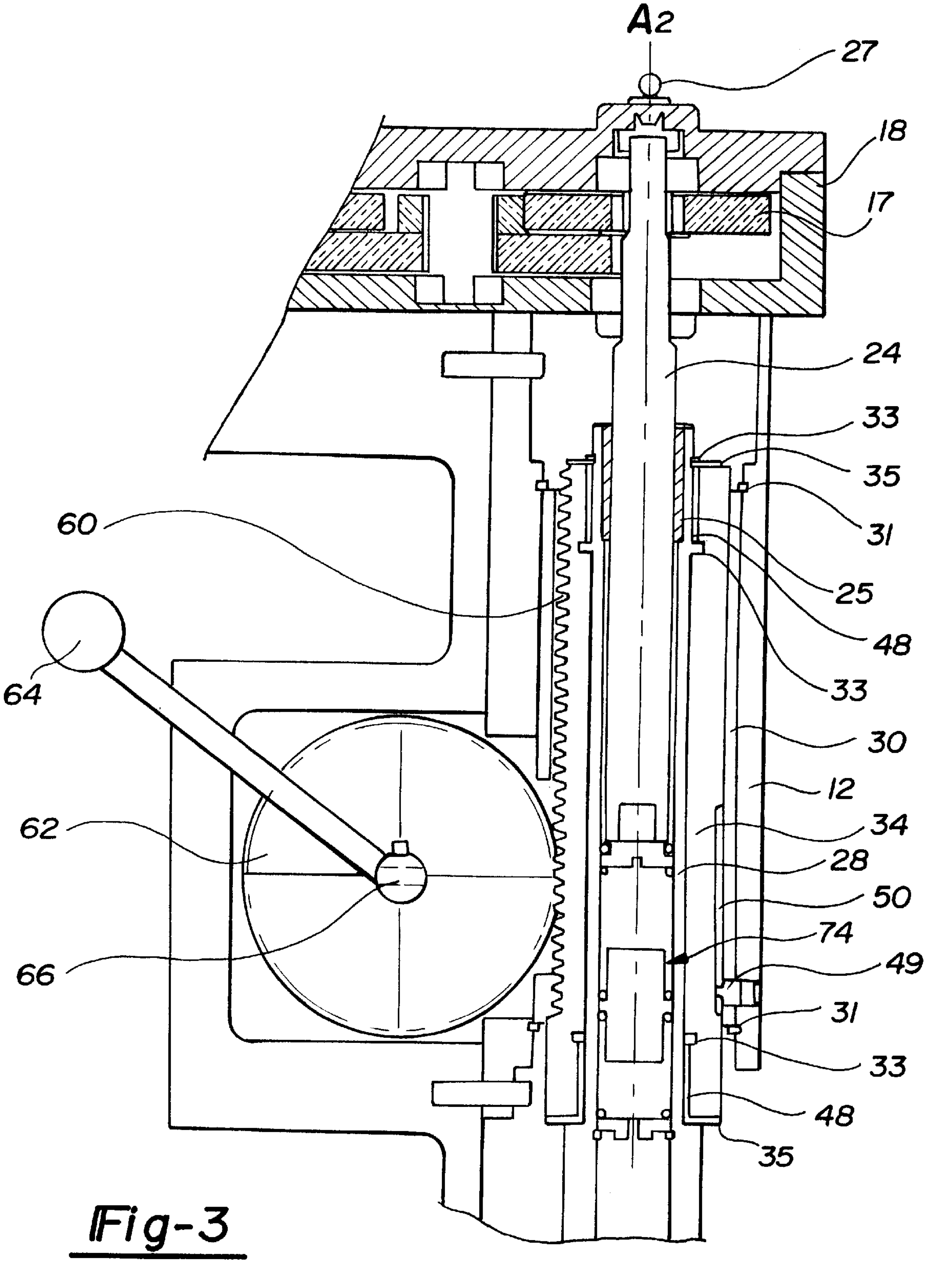
FIG. 3 is a side view of the of the quill assembly of FIG. 2 shown between the fully retracted and extended positions.

With reference to FIGS. 2 and 3, the feed mechanism 26 is shown in greater detail. The feed mechanism 26 includes a cylindrical arbor 28 having a splined bore 29 to operatively mate with the splined arbor 24. The splined arbor 24 slidably telescopes within the splined bore 29 of the cylindrical arbor 28. The cylindrical arbor 28 rotates within the cylindrical housing 34 and carries a drill tool 68 at the distal end. A set screw 37 or the like can be used to connect the drill tool 68 to the cylindrical arbor 28.

The cylindrical housing 34 rotatably retains the cylindrical arbor 28. Preferably, the cylindrical arbor 28 is rotatably retained by at least one annular bearing ring 48, a snap ring 33, and at least one thrust washer 35 per side. Although an annular bearing ring and associated retaining rings are preferred, it will be recognized that a metallic or composite bushing or sleeve could also be installed within the cylindrical housing 34 in place of the bearing ring.

The cylindrical arbor 28 is rotatably retained within the cylindrical housing 34 so that the cylindrical arbor 28 and cylindrical housing 34 move rectilinearly with respect to the splined arbor 24. The cylindrical housing 34 is thus slidably supported within the support platform 12 for movement between fully retracted and fully extended positions along arrow 15. The cylindrical housing 34 is slidably supported in the support housing 16 by a sleeve 30 preferably made of bronze and retained by snap rings 31. Although a bronze sleeve 30 is illustrated, it will be realized that a non-metallic composite sleeve could also be used to save weight The rectilinear travel of cylindrical housing 34 is limited by a spring loaded set screw 49 which passes through the support housing 12, and linearly interacts within a slot 50. By tightening the set screw 49, additional friction can be placed on the cylindrical housing 34.

Rectilinear travel of the cylindrical housing 34 is controlled by a rack 60 and a pinion 62 arrangement (FIG. 1). The rack 60 is preferably located integral to the cylindrical housing and the pinion 62 is attached to a handle 64. By rotating the handle 64, the pinion 62 rotates and moves the rack 60 and therefore the cylindrical housing 34 up and down in the direction of arrow 15. The present invention further provides for the pinion axle 66 to pass through the support platform 12 allowing the handle 64 to be removably affixed to either side. The same handle 64, rack 60, and pinon 62 arrangement thus provide for both left or right hand operation.

Figure 4B:
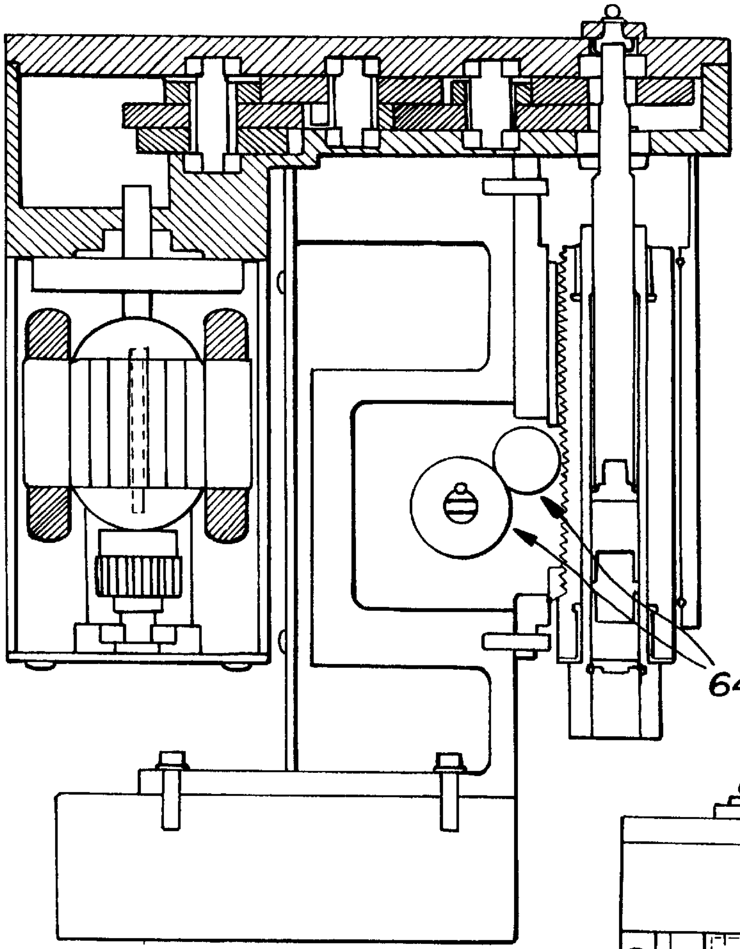
FIGS. 4A and 4B are sectional views of the present invention having an alternative gear arrangement.
Figure 4A:
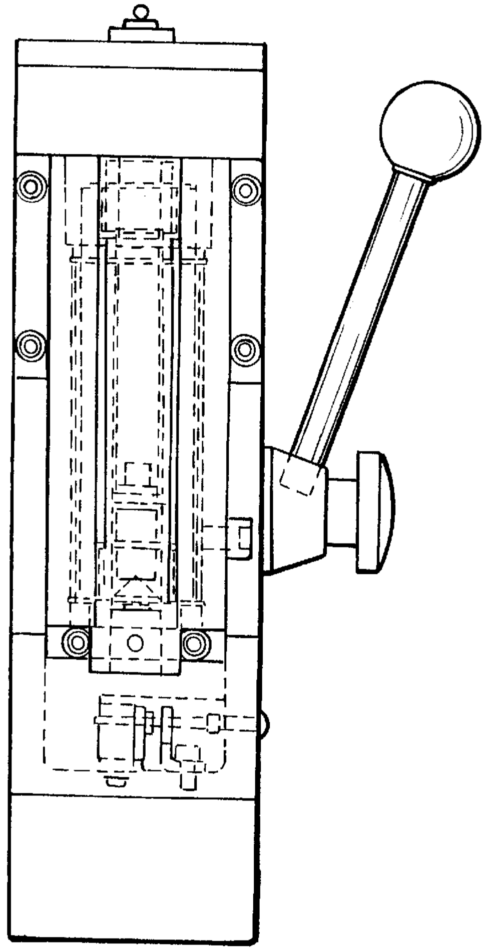

Alternatively, as shown in FIG. 4, by replacing pinion 62 with an alternate pinion gear assembly 62' having a plurality of gears, the ratio of movement between the rotation of handle 64 and cylindrical housing 34 can be controlled. Thus, for a specified angular rotation of handle 64 the cylindrical housing 34 will move a linear distance dependant on the alternate pinion gear assembly 62'. By varying this relationship an angular rotation of the handle 64, for example only, of 100°, could translate into full rectilinear travel of the cylindrical housing 34.

The cylindrical arbor 28 further includes a positive slug ejection assembly 74 (FIG. 2). To drill a hole with the present invention the drill tool 68 is preferably an annular hole cutter tool which creates a slug of material during the drilling operation. This slug of material is commonly retained within the tool 68 and must be removed prior to the next drilling operation. To remove the slug a spring 76 forces an ejector pilot 78 through a pilot hole of the annular hole cutter tool to positively eject the slug. On some occasions the spring 76 is insufficient to eject the slug. The present invention thus provides for the cylindrical arbor 28 to be retracted in the normal manner to allow the splined arbor 24 to contact the ejector pilot 78 and forcibly expel the slug from the annular cutter. By this method the slug is easily and quickly removed without delaying the drilling operation.

To inject a liquid coolant directly to the drill tool a quick attach coupling 27 is provided on support housing 16 (FIG. 1). The coupling 27 feeds coolant into a bore 29 drilled centrally along the length of the splined arbor 24. By injecting coolant by gravity or under pressure from a coolant tank (not shown) attached to coupling 27 through bore 29 the coolant is directed directly to the drill tool 68.

In operation, the motor 22 rotates about the drive axis A, driving the gear train. In turn, the gear train rotates the splined arbor 24 about the driven axis $A_2$. At the same time, the splined arbor 24 causes the cylindrical arbor 28 rotate, which causes the drill tool 68 to rotate.

As described hereinabove, the movement of cylindrical housing 34 between the fully retracted and extended positions is controlled by a pinion 62 and rack 60. The splined bore 29 of the cylindrical arbor 28 engages the splined arbor 24 and telescopes dependant on the movement of the cylindrical housing 34. As the splined arbor 24 rotates, the cylindrical arbor 28 is rotated within the cylindrical housing 34. Thus, the pinion 62 and rack 60 linearly adjusts the vertical height of the cylindrical housing 34 causing the cylindrical arbor 28 and drill tool 68 to move between the fully retracted and extended positions.

Figure 5A:
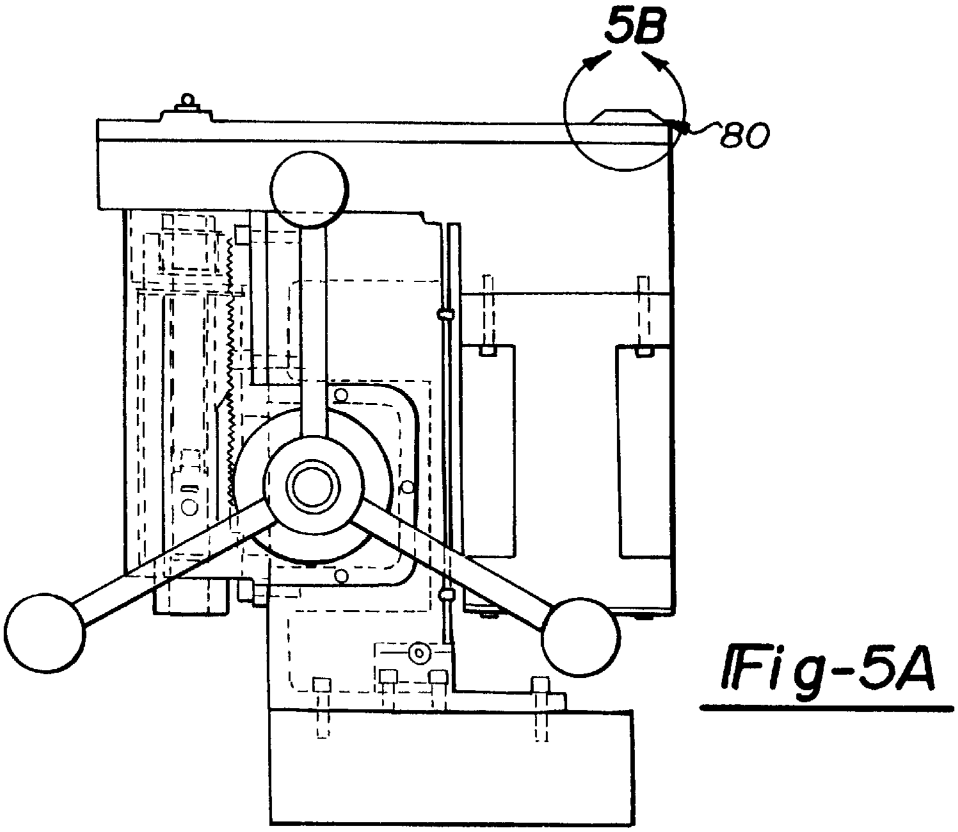
FIGS. 5A and 5B show a sensing device of the present invention.
Figure 5B:
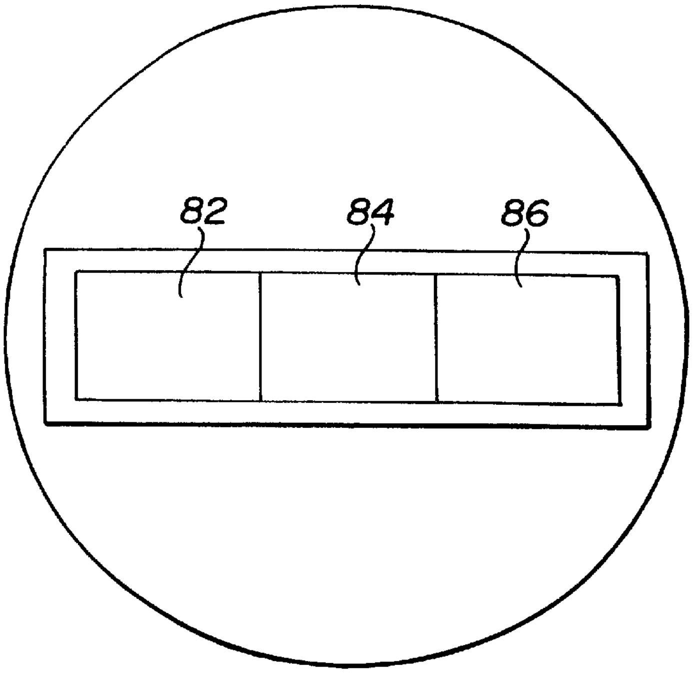

As shown in FIG. 5, to control the linear movement of the drill tool 68, the assembly 10 includes an electrical feed rate monitor 80 for providing a signal to the user as to the optimal feed rate of the drill tool 68. The monitor includes a red 82, a green 84 and a yellow 86 Light Emitting Diode. The LED's are selectively triggered by the amount of current drawn by the motor 22. For example only, the green LED 84 signals the user to maintain the current feed rate. If an inadequate amount of pressure is applied, detected amperage is below an optimal value and the yellow LED 86 is triggered to signal the user to increase the feed rate. If too much pressure is applied the amperage is above the optimal value and the red LED 82 indicates that the feed rate should be decreased.

Furthermore, the assembly includes a sensing device 88 (FIG. 1) for disconnecting the power to the motor 22 when the movement of the magnetic base 14 causes an acceleration in excess of a specified limit. The sensing device preferably includes an accelerometer mounted to the magnetic base 14. In the event the torque transmitted by the drill tool 68 causes the magnetic base 14 to move, the accelerometer provides an input signal to a signal conditioner. In turn, the signal conditioner outputs an amplified signal to a circuit board. Provided the amplified signal exceeds a specified value corresponding to the acceleration limit, the circuit board provides a signal activating a switch disconnecting the power to the motor 22.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A self attaching drill assembly having a base for mounting to a worksurface, said drill assembly comprising:

a self attaching base;

a motor supported by said self-attaching base for driving a drill tool, said motor stationarily mounted relative to said magnetic base;

a feed mechanism supported by said self attaching base for controlling the feed rate of the drill tool, said feed mechanism including a cylindrical housing, a cylindrical arbor having a splined bore, and a splined arbor slidably mounted within said splined bore, said cylindrical arbor rotatable within said cylindrical housing and mounted for slidable movement relative to said splined arbor.

2. The self attaching drill assembly of claim 1, wherein said feed mechanism provides rectilinear movement of said cylindrical housing between a retracted position and an extended position.

3. The self attaching drill assembly of claim 1, wherein said cylindrical arbor retains said drill tool.

4. The self attaching drill assembly of claim 1, wherein said motor is mounted substantially parallel to said feed mechanism.

5. The self attaching drill assembly of claim 1, wherein said motor is mounted offset from said feed mechanism.

6. The self attaching drill assembly of claim 1, further comprising a 180° gear train operatively connecting said motor to said feed mechanism.

7. The self attaching drill assembly of claim 1, further comprising a feed rate monitor connected to said motor for providing an optimal feed rate signal.

8. The self attaching drill assembly of claim 1, further comprising a coolant system connected to said splined arbor for direct supply of liquid coolant through a bore in said splined arbor to said drill tool.

9. The self attaching drill assembly of claim 1, further comprising an ejection system to forcibly displace a material slug from said drill tool.

10. The self attaching drill assembly of claim 1, further comprising a sensing device for disconnecting power from said motor when movement of said magnetic base exceeds a specified acceleration.

11. A self attaching drill assembly having a base for mounting to a worksurface, said drill assembly comprising:

a self attaching base;

a support housing mounted to said base;

a motor presenting a drive axis and stationarily mounted to said support housing;

a gear train operatively connected to said motor;

a splined arbor presenting a driven axis and rotatably connected to said gear train for rotation about said driven axis; and a feed mechanism operatively connected to said base for rectilinear movement between a retracted position and an extended position;

said feed mechanism including a cylindrical housing, and a cylindrical arbor having a splined bore, said splined bore slidably mounted to said splined arbor, said cylindrical arbor rotatable within said cylindrical housing.

12. The self attaching drill assembly of claim 11, wherein said cylindrical arbor retains said drill tool.

13. The self attaching drill assembly of claim 12, wherein said cylindrical housing has an integral rack along a portion of said cylindrical housing.

14. The self attaching drill assembly of claim 11, further comprising a cylindrical bearing between said cylinder and said cylindrical housing.

15. The self attaching drill assembly of claim 11, further comprising a composite bushing between said cylinder and said cylindrical housing.

16. The self attaching drill assembly of claim 11, further comprising an ejection system within said cylinder to forcibly displace a material slug from said drill tool.

17. The self attaching drill assembly of claim 16, wherein said splined arbor telescopes within said cylinder and contacts said ejection system when said feed mechanism is moved to said retracted position, said splined arbor actuating said ejection system to forcibly displace a material slug from said drill tool.

18. The self attaching drill assembly of claim 10, further comprising a coolant system removably connected to said splined arbor for direct supply of liquid coolant through said splined arbor and to said drill tool.

19. A self attaching drill assembly having a base for mounting to a worksurface, said drill assembly comprising:

a self attaching base;

a support housing mounted to said base;

a motor presenting a drive axis and stationarily mounted to said support housing;

a gear train operatively connected to said motor;

a splined arbor presenting a driven axis and rotatably connected to said gear train for rotation about said driven axis; and a cylindrical housing having an integral rack operatively connected to said base for rectilinear movement of said cylindrical housing between a retracted position and an extended position;

a cylinder telescopically mounted to said splined arbor and rotatably mounted within said cylindrical housing, said cylinder mounted for rectilinear movement with said cylindrical housing relative to said splined arbor and for rotation about said driven axis within said cylindrical housing.

20. The self attaching drill assembly of claim 19, wherein said feed mechanism is rotatable to move said cylindrical housing a linear distance dependant on a pinion gear assembly.

* * * * *